(12) United States Patent
Carroll et al.

(10) Patent No.: US 6,611,913 B1
(45) Date of Patent: Aug. 26, 2003

(54) ESCROWED KEY DISTRIBUTION FOR OVER-THE-AIR SERVICE PROVISIONING IN WIRELESS COMMUNICATION NETWORKS

(75) Inventors: Christopher Paul Carroll, Framingham, MA (US); Yair Frankel, Westfield, NJ (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/280,882

(22) Filed: Mar. 29, 1999

(51) Int. Cl.[7] .................................................. H04L 9/00
(52) U.S. Cl. ....................................... 713/171; 455/410
(58) Field of Search ................................ 713/171, 168; 380/247–249, 281, 273; 455/411

(56) References Cited

U.S. PATENT DOCUMENTS

| | | | | |
|---|---|---|---|---|
| 4,549,308 A | * | 10/1985 | LoPinto | 380/272 |
| 5,091,942 A | * | 2/1992 | Dent | 380/44 |
| 5,319,711 A | * | 6/1994 | Servi | 340/5.74 |
| 5,455,863 A | * | 10/1995 | Brown et al. | 380/247 |
| 5,745,572 A | * | 4/1998 | Press | 380/280 |
| 6,108,424 A | * | 8/2000 | Pitiot | 380/270 |
| 6,259,908 B1 | * | 7/2001 | Austin | 455/411 |

OTHER PUBLICATIONS

Reed, Michael G, et al, Protocols using Anonymous Connections: Mobile Applications, 1998,Naval Research Laboratory,entire document.*

Schneier, Bruce. Applied Cryptography, second edition, John Wiley & Sons, Inc. 1996 p. 70.*

C.P. Carroll, et al., "Efficient Key Distribution for Slow Computing Devices: Achieving Fast Over the Air Activation for Wireless Systems," 1998 IEEE Symposium on Security and Privacy, May 3–6, 1998, Oakland, California.

W. Diffie, et al., "New Directions in Crypotgraphy," IEEE Transactions on Information Theory, vol. IT–22, No. 6, Nov. 1976, pp. 644–654.

R.L. Rivest, et al., "A Method for Obtaining Digital Signatures and Public–Key Cryptosystems," Communications of the ACM, vol. 21, No. 2, Feb. 1978, pp. 120–126.

R.L. Rivest, et al., "On Digital Signatures and Public Key Cryptosystems," MIT Laboratory for Computer Science, Technical Report, MIT/LCS/TR–212, Jan. 1979.

J. Hastad, "On–Using RSA with Low Exponent in a Public Key Network," Advances in Cryptography—CRYPTO '85 Proceedings, Springer–Verlag, 1986, pp. 403–408.

ANSI X9.17 (Revised), "American National Standards for Financial Institution Key Management (Wholesale)," American Bankers Association, 1985.

D. Balenson, "Automated Distribution of Cryptographic Keys Using the Financial Institution Key Management Standard," IEEE Communications Magazine, vol. 23, No.. 9, Sep. 1985, pp. 41–46.

(List continued on next page.)

*Primary Examiner*—Gail Hayes
*Assistant Examiner*—Ronald Baum
(74) *Attorney, Agent, or Firm*—James K. Weixel

(57) ABSTRACT

An escrowed key distribution system for over-the-air service provisioning of cellular telephones and other wireless communication devices provides a secure and efficient authentication key distribution method for wireless communications networks. To ensure security, an authentication key used to activate the wireless device is never transmitted over the air. In addition, mutual authentication is performed between the wireless communication device and the service provider using an embedded private-key algorithm to ensure proper authentication key transfer.

25 Claims, 6 Drawing Sheets

OTHER PUBLICATIONS

Federal Information Processing Standard Publication (FIPS PUB) 171, Key Management Using ANSI X9.17, U.S. Department of Commerce, National Institute of Standards and Technology, Apr. 27, 1992.

Federal Information Processing Standard Publication (FIPS PUB) 185, Escrowed Encryption Standard, U.S. Department of Commerce, National Institute of Standards and Technology, Feb. 9, 1994.

D. Denning, et al., "A Taxonomy for Key Escrow Encryption Systems," Communications of the ACM, vol. 39, No. 3, Mar. 1996, pp. 34–40.

D. Denning, et al., "Key Escrowing Today," IEEE Communications Magazine, Sep. 1994, pp. 55–68.

D. Kahn, "The Codebreakers: The Story of Secret Writing," p 134–147, 374–302, 752–756, Macmillan Publishing Co., New York, 1967.

Y. Frankel, Y.Tsiounis, and M. Yung, "Indirect Discourse Proofs: Achieving Efficient Fair Off–Line E–Cash," Lecture Notes in Computer Science 1163, p 286–300, Asiacrypt '96, Nov 3–7, South Korea.

C. Carroll, "Key Escrow and Distribution for Telecommunications," Master's Thesis: University of Massachusetts at Lowell, Sep. 4, 1998.

* cited by examiner-

ESCROWED KEY DISTRIBUTION FOR OVER-THE-AIR SERVICE PROVISIONING IN WIRELESS COMMUNICATION NETWORKS

BACKGROUND OF THE INVENTION

A. Field of the Invention

The present invention relates generally to wireless communications, and more particularly to over the air service provisioning techniques and methods for the activation of wireless communication devices.

B. Description of the Related Art

After purchasing a wireless communication device, such as a cellular telephone, the user must have the device activated or provisioned for use. Several systems have been used or have been proposed to establish the provisioning of these devices. Generally, these systems use cryptographic authentication, confidentiality and/or identification.

Any commercial application that contains some form of cryptographic authentication, confidentiality and/or identification requires an efficient, cost effective and secure key generation and distribution capability. The requirements of the cellular phone system, however, are much more constraining than most applications because the cellular phones have very minimal computational capabilities and the authenticated setup protocol is generally performed without the user and carrier ever meeting face-to-face. Moreover, cellular phone companies desire that the key distribution and generation mechanism be as convenient and transparent to the user as possible.

The user/carrier key management infrastructure for the authentication based wireless system is based on a key hierarchy generated from a user's unique authentication key (A-key).

The A-key is, for example, a 64-bit value used to generate a user's temporary authentication keys as well as privacy keys for data, voice and messaging. There are currently several proposed and implemented approaches for A-key generation and distribution.

In one approach, the A-key is generated by the service provider using either manual entry by the customer or electronic distribution at the point of sale. This approach requires an unacceptable level of participation from an untrusted sales agent. It also requires training of sales agents, which is costly for stores, and extra time for each purchase, which can be used better for selling. Moreover, for electronic distribution, standard interfaces for all phones are needed or different equipment is required for each phone and/or manufacturer. Customers could manually enter the keys, but this method is considered unacceptable to the cellular industry because it leads to difficult key distribution mechanisms, which many customers may find as unacceptable.

Another approach is Over-the-Air Service Provisioning (OTASP), which is a process in which a wireless network can activate a subscriber rapidly without the need for an activation agent. This approach uses collaborative key generation and dissemination by the wireless communication device and the service provider, or carrier, after purchase. It does not require the manufacturer to perform a unique operation for each phone. It also eliminates the need for sales agents to program phones for customers at the point of its sale. The ultimate goal of OTASP is to enable a potential customer to purchase a wireless communication device in a store and almost instantly become activated without the hassle of waiting or dealing with an activation agent. In order to activate the customer, the carrier must input a unique A-key into the subscriber's wireless communication device in an unobtrusive, but secure manner.

Public-Key technologies such as RSA and Diffie-Hellman Key Exchange have been considered to provide secure A-key distribution in cellular networks. Although these Public-Key technologies have advantages, there are significant disadvantages to cellular telephone manufacturers, cellular switch manufacturers, cellular carriers, and most importantly cellular subscribers which affect the security, performance, and efficiency of the cellular network.

One such problem with these Public-Key technologies is the susceptibility to a man-in-the-middle (MIM) attack. Both Diffie-Hellman key exchange and RSA are susceptible to an MIM attack. The attack is possible using existing commercial technology and could be implemented relatively inexpensively. Diffie-Hellman key exchange enables rapid determination of an MIM attack while allowing a denial of service attack on a new subscriber, which may be unacceptable to service providers.

In both RSA and Diffie-Hellman key exchange, the encrypted A-Key is transmitted and created over the air interface between the service provider and the new subscriber. Because the A-key is being transmitted over the air, it may be susceptible to cryptoanalysis. Both RSA and Diffie-Hellnan key exchange also require exponentiation, which is computational intensive for an 8 or 16-bit microcontroller within existing wireless communication devices (e.g. cellular telephones). For instance, each exponentiation in a Diffie-Hellman key exchange may require two or three minutes within a cellular telephone, forcing an OTASP session to take four to six minutes. This six minutes would essentially be dead time in which the new subscriber and carrier would have to wait for voice or message privacy before the subscriber provided important personal information such as a credit card number.

RSA OTASP uses an encryption exponent of three (e=3) to reduce the processing load on a cellular telephone and significantly reduce activation time although the effect of using low exponent encryption on the security of RSA is unclear. Both OTASP Public-Key algorithms use a 512-bit modulus which is considered small for applications such as PGP (Pretty Good Privacy) and PEM (Privacy Enhanced Mail) but reduces time required for key exchange. An increase in the modulus size would significantly increase the time required for OTASP.

RSA uses a modulus that is the product of two large prime numbers. The security of RSA is based on the difficulty in factoring large numbers. Diffie-Hellman key exchange uses a single large prime number as the modulus. The security of Diffie-Hellman key exchange is dependent upon the inability of an attacker to compute the discrete log of a large number. As factoring techniques and computer processing power increase, however, the minimnum modulus size for these algorithms will have to increase in order to maintain the same level of security. As a result, the standard for these Public-Key OTASP cellular telephones will have to change to accommodate the larger message formats, causing incompatibilities between older and newer cellular telephones.

In these systems, each wireless communication device is required to perform computational intensive exponentiations. In order to reduce exponentiation time and alleviate the main CPU from excessive work, an Arithmetic Processing Unit (ALU) or Public-Key Digital Signal Processor (DSP) may be added to the device, increasing unit cost. Each wireless communication device may also use a dedicated Random Number Generator (RNG) chip to provide the secure random number generation required by Diffie-Hellman, increasing unit cost. Also, the additional hardware may reduce the battery life and performance of the devices. Additional hardware may be required at the switch to perform random number generation and exponentiation.

SUMMARY OF THE INVENTION

Systems and methods consistent with the present invention efficiently and securely perform over the air service provisioning of cellular telephones and other wireless communication devices. To ensure security, an authentication key used to activate the wireless device is never transmitted over the air. In addition, mutual authentication is performed between the wireless communication device and the service provider using an embedded private-key algorithm to ensure proper authentication key transfer.

To obtain the advantages of, and in accordance with the purpose of the invention, as embodied and broadly described herein, a method for activating a wireless communication device includes the steps of transmitting from the wireless communication device an identifier corresponding to an encrypted authentication key stored in the wireless communication device, receiving a mask at the wireless communication device in response to the transmission of the identifier, and recovering an authentication key for activating the wireless communication device by applying the mask to the encrypted authentication key.

Both the foregoing general description and the following detailed description provide examples and explanations only. They do not restrict the claimed invention.

DESCRIPTION OF THE DRAWINGS

The accompanying drawings, which are incorporated in and constitute a part of this specification, illustrate embodiments of the invention and, together with the description, explain the advantages and principles of the invention. In the drawings.

DETAILED DESCRIPTION

Figure 1:
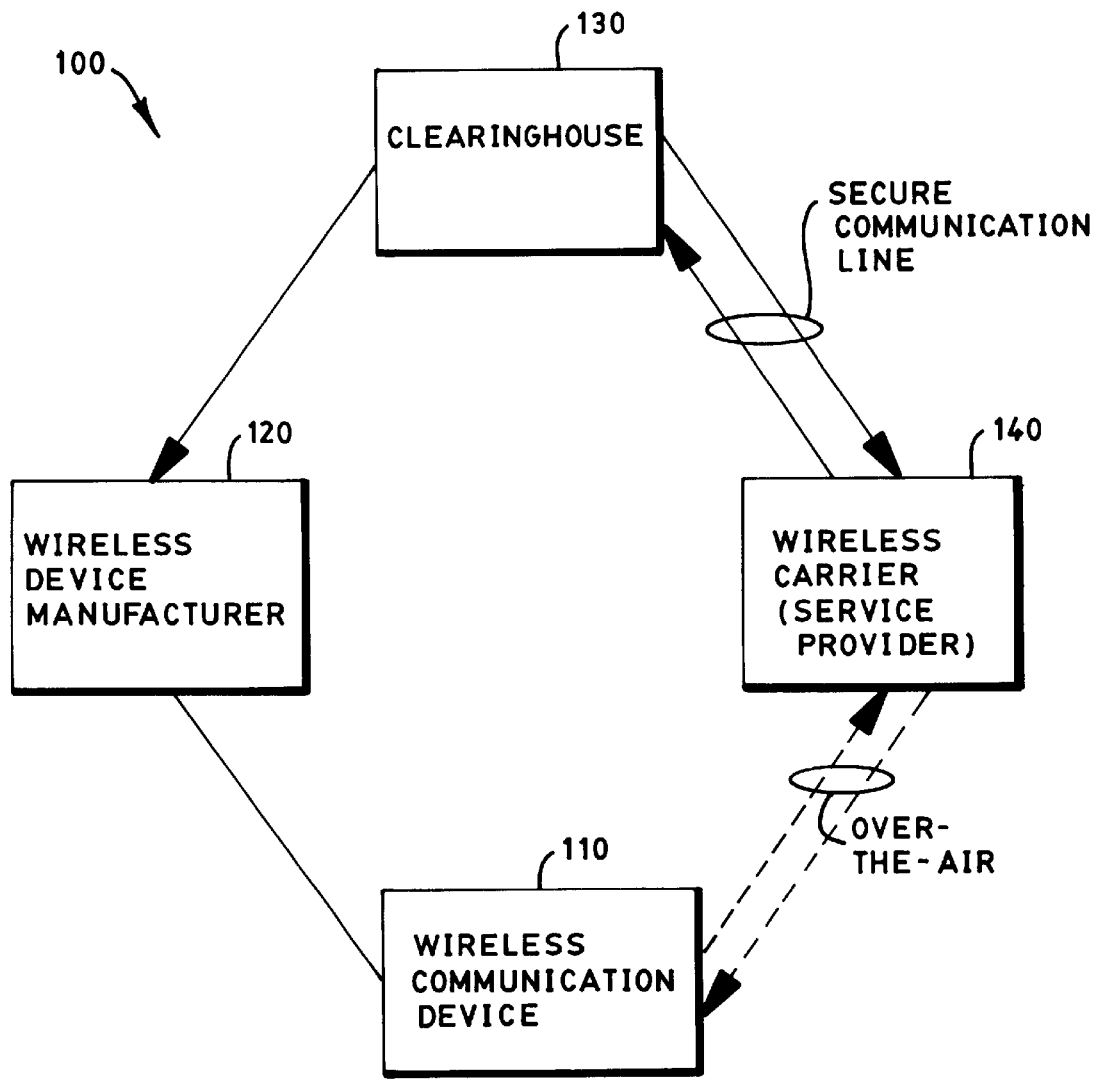
FIG. 1 is a block diagram of an escrowed key distribution system consistent with the present invention.

Reference will now be made to preferred embodiments of this invention, examples of which are shown in the accompanying drawings and will be obvious from the description of the invention. In the drawings, the same reference numbers represent the same or similar elements in the different drawings whenever possible.

Systems and methods consistent with the present invention securely perform device authentication and activation. In addition to cellular telephones, these systems and methods can be used with other devices including personal digital assistants, mobile telephones, pagers, and other remote or wireless communication devices. The present invention can also be used with any other type of device that incorporates a wireless interface, including remote surveillance systems, cable boxes or satellite boxes. For purposes of the following description, the systems and methods consistent with the present invention are only described with respect to a wireless communication device, such as a cellular telephone. The description should be understood as applying to other devices, such as the ones discussed above.

An escrowed key distribution system (EKDS) consistent with the present invention provides a fast, efficient and secure system for over-the-air service provisioning (OTASP). FIG. 1 shows an example of an EKDS 100 for OTASP, consistent with the present invention. As shown in FIG. 1, EKDS 100 includes four entities: a clearinghouse 130, a manufacturer 120, a carrier 140, and a wireless communication device 110. Clearinghouse 130 randomly generates authentication keys (A-keys or AKs), encrypts each key using a one-time pad, assigns a unique key identification number (AKID) to each encrypted A-key, and archives the keys. Upon request, clearinghouse 130 provides the encrypted or masked A-key (MAK) and associated identification number AKID, referred to as the activation pair, to manufacturer 120. Manufacturer 120 securely inserts the activation pair or pairs into each wireless communication device 110 during the manufacturing of the wireless communication devices.

During OTASP, a wireless communication device 110 transmits the unique identification number AKID over the air to carrier 140. Carrier 140 relays the unique identification number AKID to clearinghouse 130, who returns the associated A-key and mask to carrier 140 over a secure communication line. Then, carrier 140 transmits the mask over the air interface to wireless communication device 110. Finally, mutual authentication is performed between wireless communication device 110 and carrier 140 or wireless communication device 110 and clearinghouse 130 using an embedded private-key algorithm to ensure proper A-key transfer.

The following is a more detailed description of each of the terms and values used by EKDS 100 to activate a wireless communication device. First, the authentication key AK is a variable length random number, the length depending on the private-key algorithm used for generating the AK, which is escrowed and distributed. Each wireless communication device requires a unique authentication key to be activated. A mask M is generated by a one-time-pad (OTP) and used to encrypt each AK. The mask M provides, for example, a Vernam cipher of the AK. Assuming the OTP can generate a purely random number, the OTP is unconditionally secure. In other words, even with infinite processing power, an attacker will not have the ability to determine the AK without the mask.

The masked authentication key MAK, also referred to as the encrypted key EK, can be generated by applying an exclusive-or of AK and M, as shown by equation (1) below:

$$MAK_i = AK_i \oplus M_i. \tag{1}$$

A unique identification number AKID is used to identify each unique $MAK_i$. Thus, for each $MAK_i$, $AK_i$, and $M_i$, there is an $AKID_i$. The combination of AKID and MAK used for authentication key distribution is referred to as the activation pair. Each activation pair is a one-time token that allows the activation of only one communication device. After an activation pair is used, the escrow agent, which corresponds to clearinghouse 130 in EKDS 100, destroys all information associated with the $AKID_i$.

For mutual authentication, there is both a wireless or mobile state verifier (VERM) and a clearinghouse verifier (VERC). $VERC_i$ is a unique result based on $AK_i$, and $M_i$ and is calculated by clearinghouse 130 using an embedded private-key algorithm. VERC is transmitted to activating wireless communication device 110 to allow authentication of the transmitted mask. VERM is also a unique result based on $AK_i$, and $M_i$. $VERM_i$ is calculated using the private-key embedded algorithm included in wireless communication device 110. Wireless communication device 110 uses $VERM_i$ to authenticate the mask, $M_i$ by verifying that the transmitted $VERC_i$ is equal to $VERM_i$. The embedded private-key algorithm is, for example, the Cellular Authentication and Voice Encryption (CAVE) algorithm used in North American cellular telephone networks. In GSM cellular network environments, the embedded private-key algorithm might be the A3/A8 algorithm or COMP 128 algorithm. Other wireless devices can have, for example, the Data Encryption Standard (DES) as the embedded private-key algorithm or another algorithm that permits mutual verification.

If the CAVE algorithm is used as the embedded private-key algorithm, then the $VERM_i$ is can be generated as a unique 18-bit result based on $AK_i$, and $M_i$. For example, $VERM_i$ is calculated using the embedded CAVE algorithm based on the Authentication Signature Calculation Procedure in Section 2.3 of the TR45.0.A Common Cryptographic Algorithms. CAVE initial loading can be performed according to Table 1 for over the air service provisioning. The acronyms indicated in Table 1 are defined as follows: AAV—authentication algorithm version; LSFR—linear shift feedback register; LSB—least significant bit; and MSB—most significant bit.

TABLE 1

CAVE Initial Loading for OTASP

| CAVE Item | Source Identifier | Size (bits) |
|---|---|---|
| LSFR | 32 MSBs of $M_i$ | 32 |
| Reg [0–7] | A-key ($AK_1$) | 64 |
| Reg [8] | AAV | 8 |
| Reg [9–11] | 24 LSBs of A-key | 24 |
| Reg [12–15] | 32 LSBs of $M_i$ | 32 |

With the CAVE algorithm, $VERC_i$ can be calculated by clearinghouse 130 as a unique 18-bit result based on based on $AK_i$, and $M_i$. For example, $VERC_i$ is calculated using the embedded CAVE algorithm based on the the Authentication Signature Calculation Procedure in Section 2.3 of the TR45.0.A Common Cryptographic Algorithms. CAVE initial loading can also be performed according to Table 1. As noted above, $VERC_i$ is transmitted to the activating wireless communication device 110 to allow the authentication of the transmitted mask.

Figure 2:
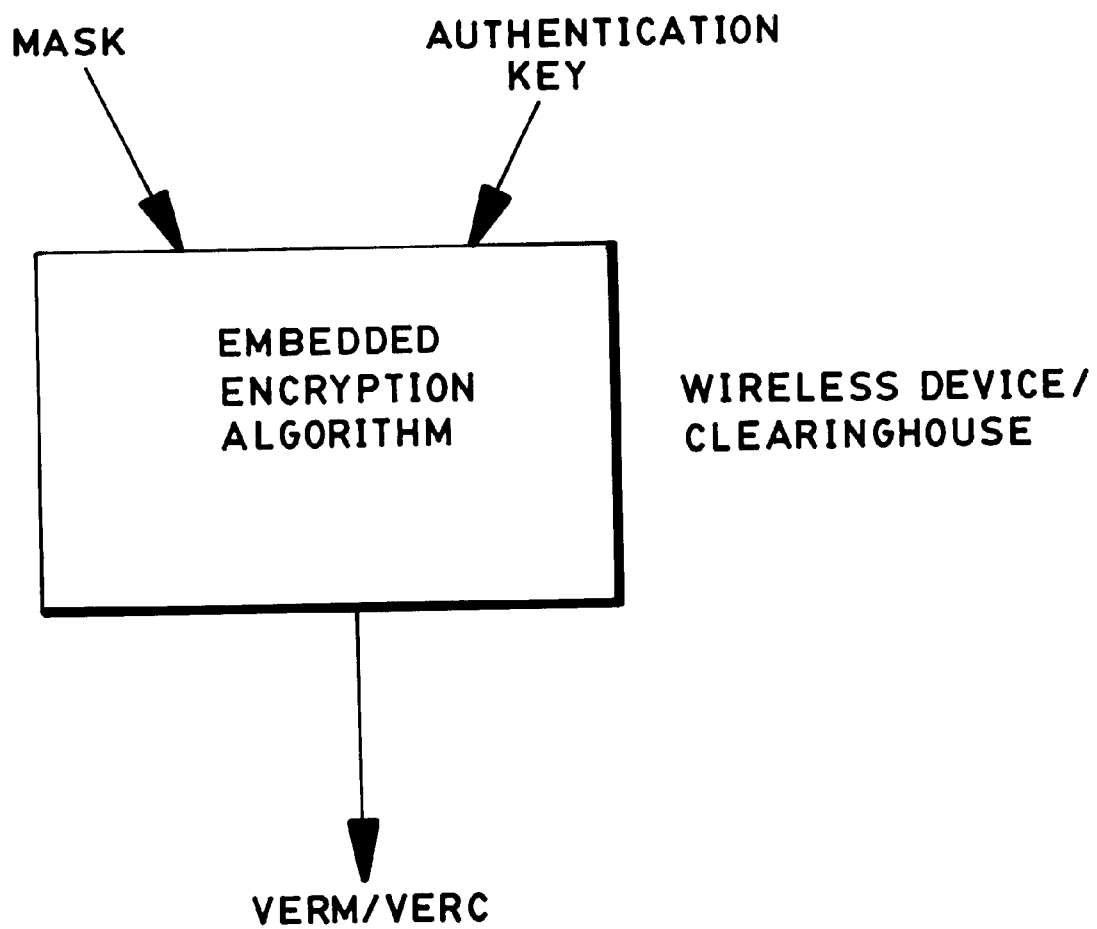
FIG. 2 is a block diagram of the embedded key algorithm for generating the verifiers consistent with the present invention.

In the exemplary embodiment, the electronic serial number (ESN) is purposely not used to enable clearinghouse 130 to calculate $VERC_i$ and prevent clearinghouse 130 from associating the ESN and A-key. As indicated above, the activating wireless communication device 110 uses $VERM_i$ to authenticate the mask ($M_i$) by verifying that the transmitted $VERC_i=VERM_i$. FIG. 2 provides an illustration of VERM and VERC generation.

Both the wireless carrier 140 and the activating wireless communication device 110 generate the same A-key independently and perform modified shared secret number (SSD) or over the air shared secret number (OTASSD) generation. The activating wireless communication device 110 is authenticated by the clearinghouse 130 (or wireless carrier 140 with an ACK to clearinghouse 130) using, for example, the CAVE algorithm or another embedded private-key algorithm. After the activating wireless communication device 110 is authenticated, a voice privacy session can be initiated to allow the subscriber to provide personal information to the serving wireless carrier 140 securely. If wireless communication device 110 is an AMPS cellular telephone using analog voice channels, then voice privacy using the CAVE suite of algorithms will be precluded. As a result, an additional procedure may be necessary, such as the CMEA of CAVE, to encrypt private subscriber information (e.g., a credit card number).

The following is a more detailed description of the physical components and features of EKDS 100. Clearinghouse 130, also referred to as the escrow agent, is entrusted with the secure generation of authentication keys AKs and the creation of activation pairs. Clearinghouse 130 distributes the activation pairs to wireless communication device manufacturers 120. When presented with a unique $AKID_i$, clearinghouse 130 provides carrier 140 with the $M_i$, $AK_i$, and $VERC_i$ associated with the unique $AKID_i$. After authenticating the activating wireless communication device 110, clearinghouse 130 securely discards $AK_i$ and $M_i$ to prevent $AK_i$ from being compromised in the future.

Manufacturer 120 securely maintains and inserts one or more activation pairs into each wireless communication device during the manufacturing process. The insertion of activation pairs can occur at any time in the manufacturing process, but most likely in the last stage of the process.

During OTASP, carrier 140, also referred to as the service provider, receives the unique $AKID_i$ from a potential subscriber's wireless communication device 110. Carrier 140 transmits the $AKID_i$ to clearinghouse 130 over a secure communication line and receives the associated unique $M_i$, $AK_i$, and $VERC_i$. Carrier 140 then transmits the mask $M_i$ to the activating wireless communication device 110. Both carrier 140 and activating wireless communication device 110 generate the same A-Key (or encryption key) independently and perform mutual authentication.

Each wireless communication device 110, such as a cellular telephone, is pre-loaded with one or more activation pairs by manufacturer 120. Each device 110 should have the ability to hold multiple activation pairs that will support multiple activations and provide reliability in the activation process. For instance, each wireless communication device 110 could be loaded with four activation pairs. Each wireless communication device also has a unique electronic serial number (ESN).

During OTASP, wireless communication device 110 transmits $AKID_i$ over the air interface to carrier 140. Carrier 140 responds with the associated $M_i$, which allows wireless communication device 110 to recover the original $AK_i$. Even if a MIM captures the $AKID_i$ and $M_i$, the MIM would be unable to recover the $AK_i$ without also having $MAK_i$. Wireless communication device 110 also receives $VERC_i$ for comparison with $VERM_i$. If $VERC_i$ is equal to $VERM_i$, the received mask is authentic.

Figure 3:
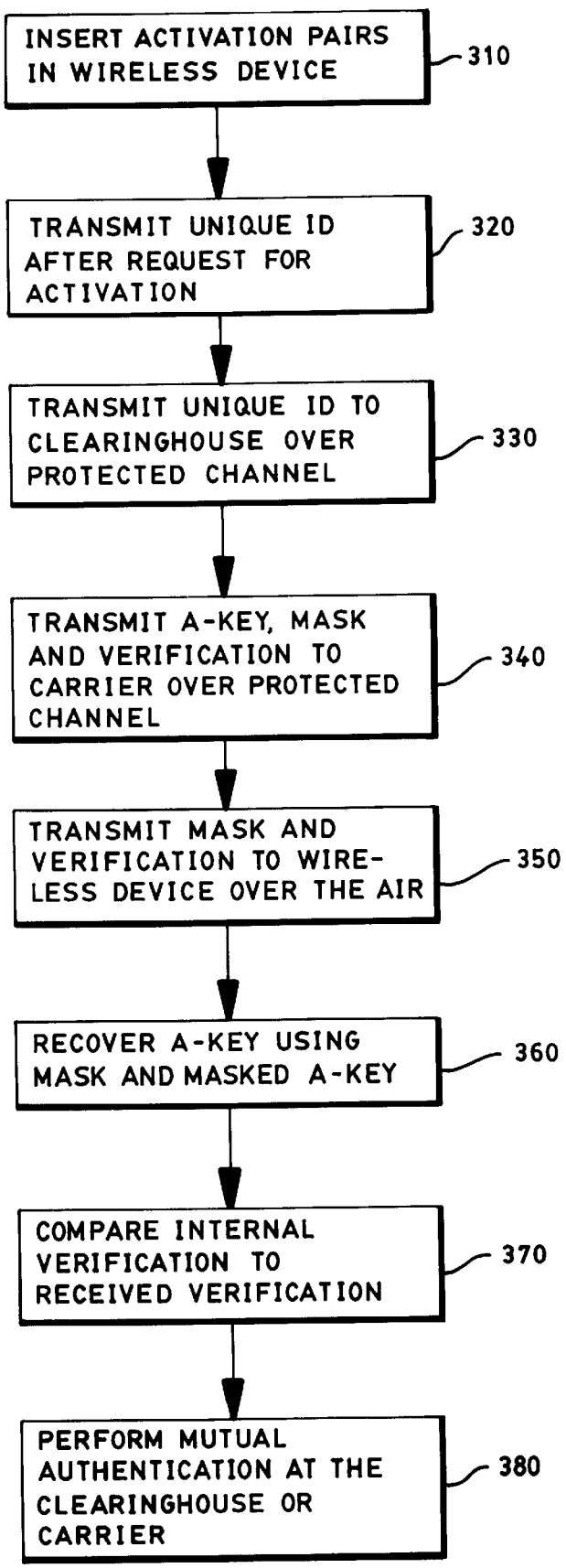
FIG. 3 is a flow diagram for an over-the-air service provisioning consistent with the present invention.

FIG. 3 shows a flow chart for an OTASP process for a wireless communication device consistent with the present invention. First, manufacturer 120 requests a variable number of activation pairs, such as four, from clearinghouse 130 and inserts the activation pairs into a non-volatile memory in wireless communication device 110 (step 310). Manufacturer 120 preferably uses appropriate security precautions to prevent an unscrupulous employee or hacker from acquiring activation pairs. Manufacturer 120 may also ship the device to a department store within a tamper-detection package.

When a subscriber buys a wireless communication device 110, the device is removed from its package and powered-on. In response to a request for activation by the subscriber, wireless communication device 110 requests activation from carrier 140, the service provider, by-transmitting the unique $AKID_i$ from one of the activation pairs stored within device 110 (step 320). Generally, the unique $AKID_i$ chosen in the initial request is from the activation pair at the top of the stored list. After receiving the unique $AKID_i$, carrier 140 transmits $AKID_i$ to clearinghouse 130 over a protected communication channel (step 330).

Clearinghouse 130 receives the $AKID_i$ and returns the associated unique $AK_i$, $M_i$, and $VERC_i$ to carrier 140 over the protected communication channel (step 340). $VERC_i$ is generated using the embedded private-key algorithm with $M_i$ and $AK_i$ as inputs as shown in FIG. 2. Carrier 140 then transmits the mask $M_i$ and $VERC_i$ over the air interface to the activating wireless communications device 110 (step 350).

After receiving mask $M_i$ and $VERC_i$ from carrier 140, activating wireless communication device 110 uses $M_i$ and $MAK_i$, to recover $AK_i$, such as by applying an exclusive-or operation to $M_i$ and $MAK_i$ (step 360). Activating wireless communication device 110 then generates $VERM_i$ using its embedded private-key encryption algorithm with $M_i$ and $AK_i$, as inputs as shown in FIG. 2. If $VERM_i$ is equal to $VERC_i$, the transmitted mask $M_i$ is authentic and accepted by activating wireless communication device 110 (step 370). As demonstrated by the process shown in FIG. 3, $AK_i$ is never transmitted over the air interface.

Activating wireless communication device 110 can be authenticated by clearinghouse 130 or by carrier 140 using the embedded private-key encryption algorithm (step 380). When authenticated by carrier 140, carrier 140 sends an acknowledge signal to clearinghouse 130 that the authentication has been verified. After activating wireless communication device 110 is authenticated, clearinghouse 130 discards $AK_i$ and $M_i$ to prevent $AK_i$ from being compromised in the future. In addition, a voice privacy session may then be initiated to allow the subscriber to provide personal information to carrier 140 securely.

Figure 4:
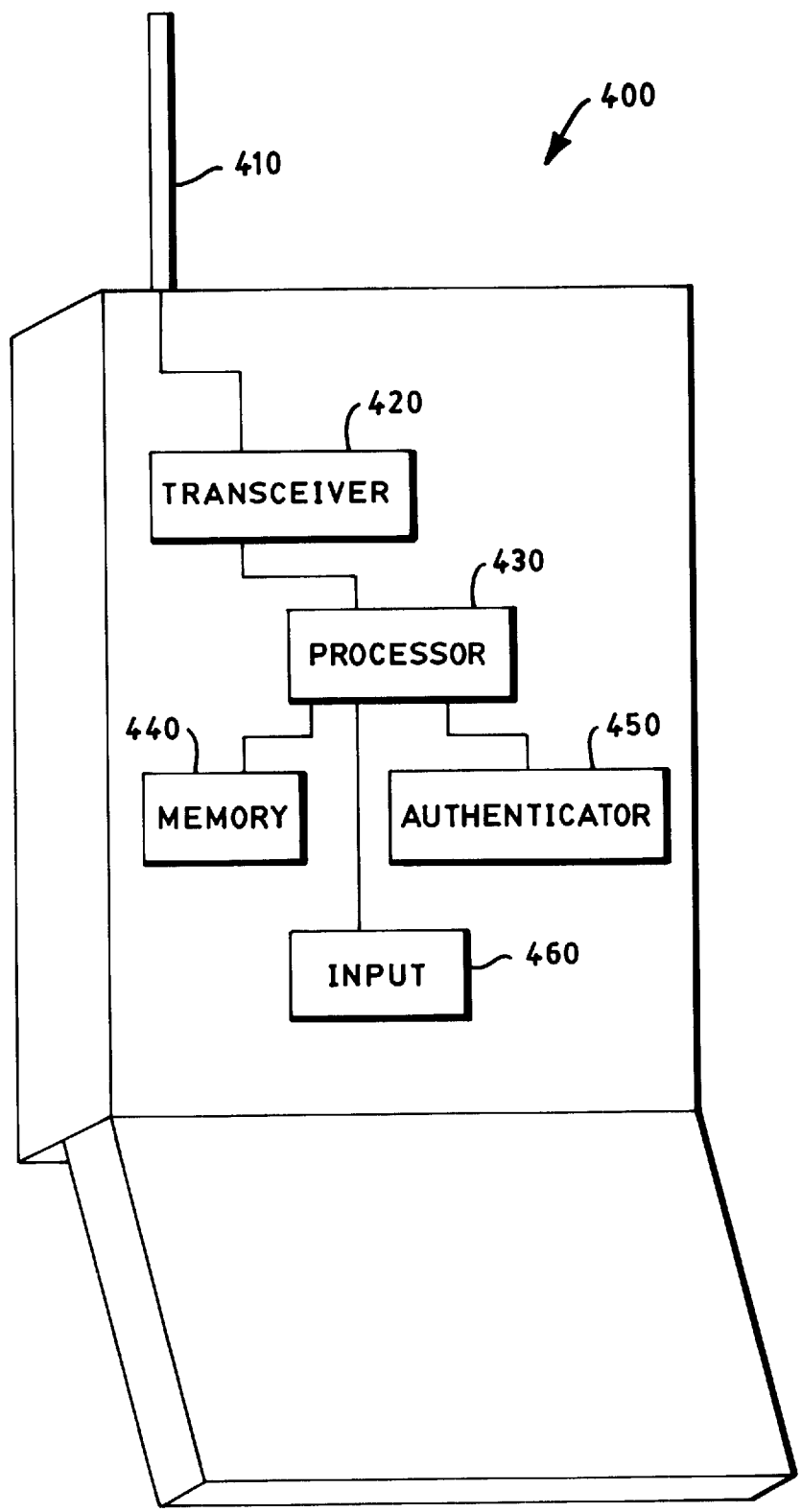
FIG. 4 is a block diagram of a wireless communication device consistent with the present invention.

FIG. 4 shows a block diagram of a wireless communication device 400 consistent with the present invention. As shown in FIG. 4, wireless communication device 400 includes an antenna 410, a transceiver 420, a processor 430, a memory 440, an authenticator 450, and an input 460.

After purchasing wireless communication device 400, a user would initiate the activation process using input 460. In response to the initiation of the activation process, processor 430 selects one of the activation pairs stored in memory 440 and extracts the unique AKID of the selected activation pair. Processor 430 then passes the AKID to transceiver 420, which transmits the AKID to carrier 140 via antenna 410.

Carrier 140, after contacting clearinghouse 130, transmits the associated mask and VERC to transceiver 420 via antenna 410. Processor 430 receives the mask M and VERC from transceiver 420 and extracts the masked authentication key MAK from the selected activation pair in memory 440. Using M and MAK, processor 430 recovers the authentication key AK and passes VERC, M and AK to authenticator 450. Authenticator 450 includes the embedded private-key encryption algorithm for generating VERM from M and AK. Authenticator 450 then compares VERM to VERC to determine whether the received mask M is authentic. If VERM and VERC are equal, then mask M is authentic and wireless communication device 110 can be activated.

Mutual authentication preferably occurs between activating wireless communication device 110 and clearinghouse 130 because clearinghouse 130 is responsible for maintaining the activation pairs. Because the authentication procedure already exists, clearinghouse 130 uses the embedded private-key encryption algorithm challenge-response procedure to authenticate the activating wireless communication devices. In order to authenticate the wireless communication device, the secret AK and random number mask are input into the embedded private-key algorithm. Then, a random challenge is transmitted to wireless communication device 110, which provides a response dependent on the secret A-key, random input, and random challenge. After authenticating wireless communications device 110, clearinghouse 130 securely discards (destroys) AK and $MAK_i$.

Figure 5:
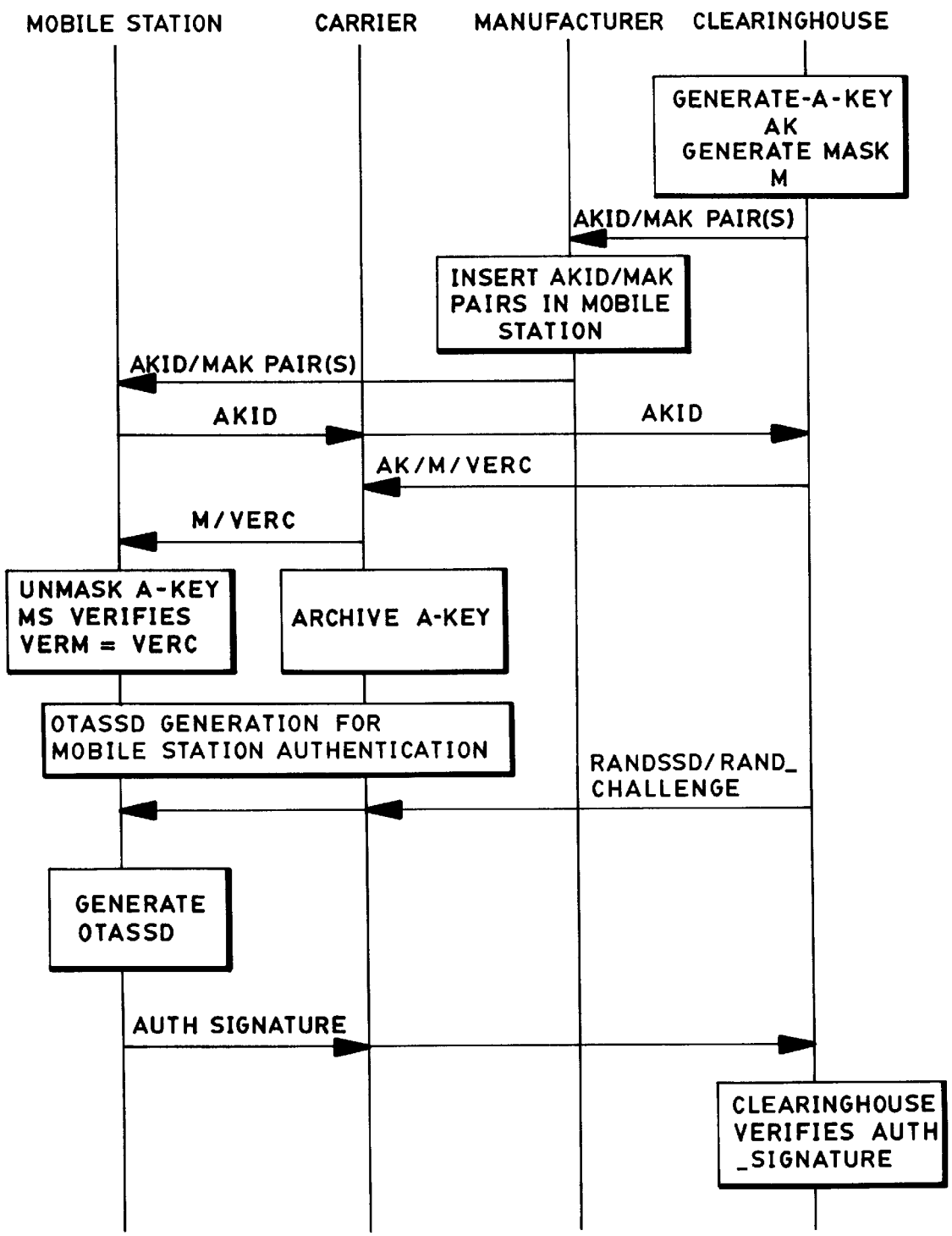
FIG. 5 illustrates, in accordance with an aspect of the invention, the signal flow in an escrowed key distribution system for an over the air service provisioning method with mutual authentication.

If the CAVE algorithm is used as the embedded private-key algorithm, then clearinghouse 130 can use, for example, the CAVE challenge-response procedure to authenticate the activating wireless communication device 110 or mobile station. In order to perform the CAVE challenge-response procedure, clearinghouse 130 and wireless communication device 110 must generate SSD. Because SSD generation occurs between clearinghouse 130 and wireless communication device 110, the procedure is referred to as OTASSD. During OTASSD generation, clearinghouse 130 transmits RANDSSD and the RAND_CHALLENGE via wireless carrier 140 to wireless communication device 110. Since clearinghouse 130 should not know the ESN of the activating wireless communication device 110, the 32 LSBs of $M_i$ should replace the ESN in the Section 2.2.1 SSD Generation Procedure of the TR45.0.A Common Cryptographic Algorithms. The activating wireless communication device 110 computes and transmits the AUTH_SIGNATURE via wireless carrier 140 to clearinghouse 130. After verifying the AUTH_SIGNATURE, clearinghouse 130 discards or destroys $AK_i$ and $MAK_i$. If wireless carrier 140 trusts clearinghouse 130, wireless carrier 140 can use OTASSD as SSD for authentication and voice privacy or wireless carrier 140 can perform an additional SSD update. OTASSD is partially dependent on the 32 LSBs of $M_i$ while SSD is partially dependent on the ESN. FIG. 5 illustrates the signal flow for this procedure.

Figure 6:
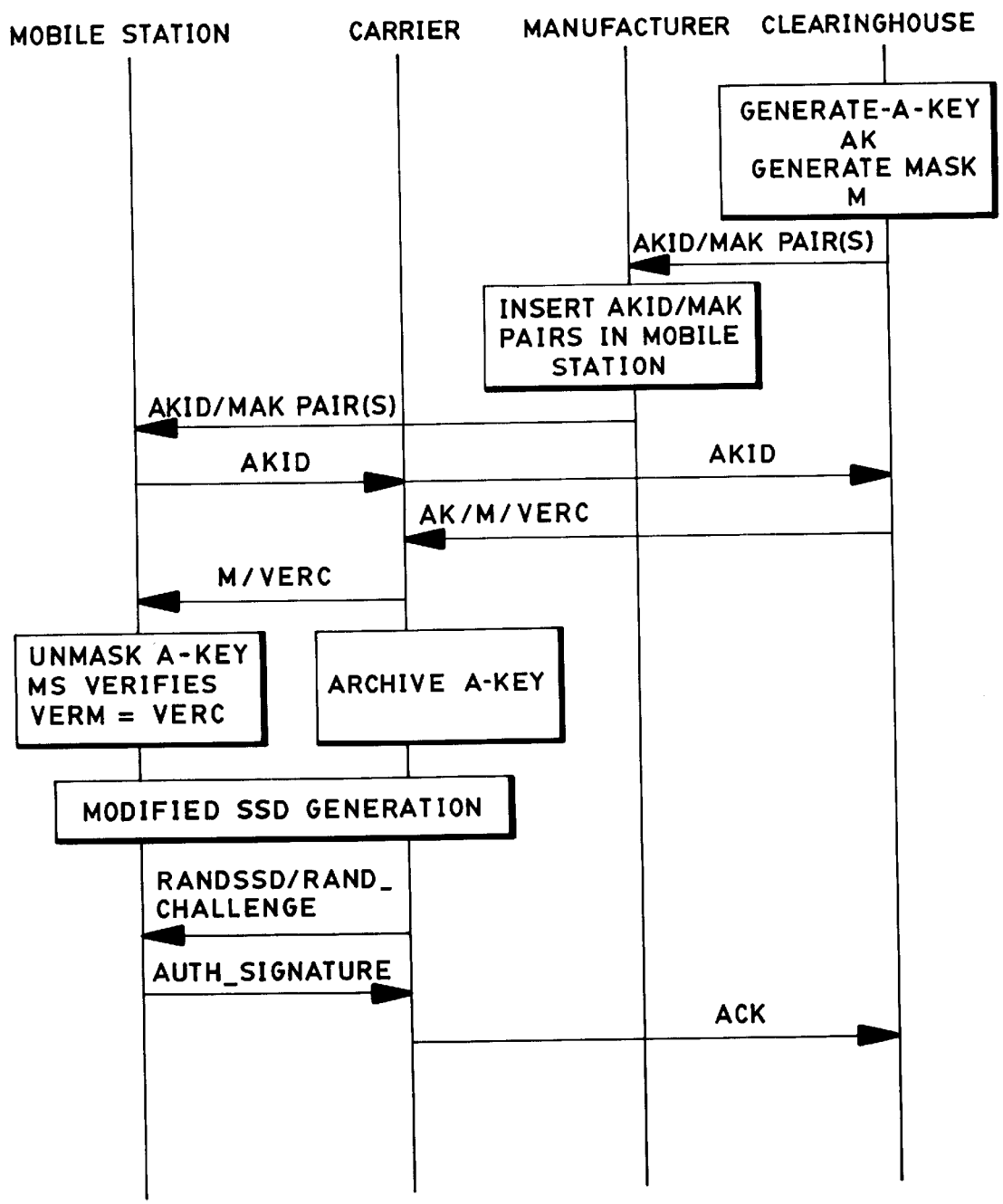
FIG. 6 illustrates, in accordance with another aspect of the invention, the signal flow in an escrowed key distribution system for an over the air service provisioning method with a trusted carrier.

In an alternative method, carrier 140 performs the embedded private-key encryption algorithm challenge-response with the activating wireless communication device 110 or mobile station. For example, wireless carrier 140 can perform the initial SSD generation and CAVE challenge-response with wireless communication device 110. Once carrier 140 authenticates activating wireless communication device 110 by, for example, verifying the $AUTH_{13}$ SIGNATURE, carrier 140 transmits the acknowledge signal (ACK) to clearinghouse 130. This procedure is more efficient but requires clearinghouse 130 to trust carrier 140. FIG. 6 illustrates the signal flow for this alternative method. In FIG. 6, activating wireless communication device 110 has previously authenticated clearinghouse 130 by verifying that $VERM_i = VERC_i$.

The steps and functions of the elements are not limited to those described above. For example, carriers could generate their own activation pairs securely and provide these pairs to a manufacturer when purchasing new wireless communication devices. Unfortunately, this technique would prevent, for example, a wireless communications device purchased in Boston from being activated in Los Angeles unless carriers distributed their activation pair databases. To improve security and reliability, multiple escrow agents or clearinghouses could employ additional techniques such as secret sharing to protect the activation pair database. Multiple clearinghouses could also be utilized to generate and maintain activation pairs.

EKDS 100 has numerous advantages over the proposed public-key OTASP standards proposed for 15–41 MAP (Mobile Application Part) cellular networks. First, EKDS 100 is not susceptible to a MIM attack, whereas both Diffie-Hellman key exchange and RSA are susceptible to a MIM attack. The attack is possible using existing commercial technology and could be implemented relatively inexpensively. Diffie-Hellman key exchange enables rapid determination of an MIM attack but also denies service to a new subscriber, which may be unacceptable to service providers. EKDS 100, on the other hand, uses mutual authentication, which makes it invulnerable to a MIM attack.

EKDS 100 also significantly reduces the activation time needed for subscriber. Both RSA and Diffie-Hellman key exchange require exponentiation, which is computational intensive for the 8 or 16-bit microcontroller within existing wireless communication devices. A Diffie-Hellman OTASP session could require four to six minutes. This four to six minutes would essentially be dead time in which the new subscriber and carrier would have to wait for A-key generation to initiate voice or message privacy before the subscriber could provide important personal information such as a credit card number. In EKDS 100, the only limiting factor is the time delay in retrieving the mask M from the clearinghouse 130, which should require only seconds.

Unlike the public-key OTASP systems, the security of EKDS 100 will not degrade with time. RSA uses a modulus which is the product of two large prime numbers. The security of RSA is dependent on the difficulty in factoring large numbers. Diffie-Hellman key exchange uses a large prime number as a modulus. The security of Diffie-Hellman key exchange is dependent on the inability of an attacker to compute the discrete log of a large number. As factoring techniques and computer processing power increase, the minimum modulus size for these algorithms will have to increase in order to maintain the same level of security. Thus, the standard for these Public-Key OTASP wireless communication devices will have to change to accommodate the larger message formats, causing incompatibilities between older and newer cellular telephones. Message traffic in EKDS, however, can remain constant with time and depends only on the size of the authentication key and authentication procedure.

The use of EKDS 100 also results in a significant reduction in message traffic. EKDS 100 only requires a message length equivalent to the size of the A-key to unmask the A-key. Additional bits are required to perform mutual authentication, but the amount is fixed and less than the amount required for Public-key OTASP. As a result, the communication bandwidth can be used more efficiently in the wireless network.

Another benefit of the EKDS 100 is that it significantly reduces manufacturing costs for wireless device manufacturers. In Public-Key OTASP, each wireless communication device requires the performance of computational intensive exponentiations. To reduce exponentiation time and alleviate the main CPU from excessive work, an ALU or DSP may be added to the wireless device, which increases unit cost. Each wireless device may also use a dedicated random number generator (RNG) chip to provide the secure random number generation for both public-key protocols, which also increases unit cost. This additional hardware may reduce the battery life and performance of the wireless communication device. In contrast, existing wireless communication devices, such as cellular telephones, may need only software modification to perform OTASP with EKDS 100. The software modification would be minimal as compared to the extensive hardware and software modification needed for Public-Key OTASP.

EKDS 100 also provides a significantly reduced cost for wireless switch manufacturers. In Public-key OTASP, a wireless switch authentication center may require additional hardware to perform random number generation and exponentiation. For EKDS 100, however, existing wireless switches may require only software modification to perform OTASP.

EKDS 100 provides another benefit with respect to random number generation. As opposed to performing random number generation in millions of wireless communication devices and thousands of wireless switches, EKDS 100 performs random number generation at clearinghouse 130, significantly reducing overall system cost and complexity. With a central random number generator source, carriers could establish guidelines for clearinghouse 130 to perform true random number generation in a secure manner. Also, significant resources could be concentrated on ensuring proper random number generation.

With respect to security, EKDS 100 provides a much safer activation process because the A-key is not transmitted over the air interface. In contrast, the public-key OTASP systems do transmit the A-key over the air interface. Although public-key OTASP encryption may be sufficient, the effects on security of using hybrid forms of RSA and Diffie-Hellman key exchange to improve efficiency are unclear.

Unlike the public-key OTASP systems, EKDS 100 provides for mutual authentication by using embedded private-key encryption algorithm to perform mutual authentication between the wireless communication device and Carrier. EKDS 100 is a simple, secure, and efficient key distribution system in which the vulnerabilities can be clearly understood by all parties involved in the OTASP process. The security of EKDS is mainly reliant on database and computer security which is well defined and understood as opposed to the esoteric issues of random number generation, minimum acceptable public-key modulus size, or the feasibility of an MIM attack. But most importantly, EKDS 100 allows an end user/subscriber to be activated in a secure and timely manner.

Although EKDS 100 does have some vulnerabilities, these vulnerabilities are clearly understood and can be avoided by taking certain precautions. First, the AKID/AK/M database must be maintained securely. There are many widely accepted security techniques and commercial products available to ensure that this database is protected. In the event that the database is compromised, however, EKDS 100 is designed to limit the effect of an attack:

One design that limits the effect of an attack is that there is no binding between AKID/AK/MAK database and the electronic serial number (ESN) of a wireless communication device 110. Because there is no binding between each unique AKID/AK/M record and the ESN, the attacker would have to monitor every network in North America for the actual activation in order to associate the A-key with the proper ESN. In addition, since each AKID/AK/M record is destroyed by clearinghouse 130 after each activation process, a compromise of the database would not affect those wireless communication devices activated prior to the compromise. Wireless communication devices that are activated more than once could be affected, however.

In EKDS 100, each manufacturer 120 would be responsible for the protection of the activation pairs ($AKID_i/MAK_i$) provided by clearinghouse 130. Once again, procedures could be implemented to ensure secure insertion of activation pairs within wireless communication devices 110. In the event that an attacker obtained activation pairs from manufacturer 120, the attack would also require the attacker to monitor the wireless network to determine the A-key and ESN of a target cellular telephone, forcing the attacker to know the destination of the manufacturer's telephones. Such an attack would be limited to only a particular manufacturer 120.

A more likely attack may involve an unscrupulous department store employee extracting activation pairs from wireless communication devices prior to their sale. Once again, the employee would also have to monitor the local wireless communications network to obtain the mask M and determine the A-key of a target wireless device. Tamper-detection packaging could reduce the potential of this attack. Also, this attack would be limited and traceable by the carrier 140. Finally, the backbone network security should be sufficient to prevent eavesdropping on communications between carriers 140, clearinghouse 130, and manufacturers 120.

CONCLUSION

The escrowed key distribution system for over-the-air service provisioning provides a secure and efficient authentication key distribution method for wireless communications networks. The EKDS is secure yet simple enough to enable rapid implementation with minimal cost and complexity. The security model and vulnerabilities are easily understood, which enables the parties involved to prevent fraud. Most importantly, the EKDS allows a subscriber to rapidly and securely activate their wireless communication device.

It will be apparent to those skilled in the art that various modifications and variations can be made to disclosed embodiments of the present invention without departing from the scope or spirit of the invention. Other embodiments of the invention will be apparent to those skilled in the art from consideration of the specification and practice of the embodiments of the invention disclosed herein. The specification and examples should be considered exemplary, with the true scope and spirit of the invention being indicated by the following claims and their full range of equivalents.

What is claimed is:

1. A method for activating a wireless communication device, comprising:
   transmitting from the wireless communication device an identifier corresponding to an encrypted authentication key stored in the wireless communication device;
   receiving a mask at the wireless communication device in response to the transmission of the identifier; and
   recovering an authentication key for activating the wireless communication device by applying the mask to the encrypted authentication key.

2. A method according to claim 1, wherein the act of receiving includes receiving an external verifier at the wireless communication device.

3. A method according to claim 2, further comprising:
   generating an internal verifier at the wireless communication device using the mask and the authentication key; and
   authenticating the mask by comparing the external verifier to the internal verifier.

4. A method according to claim 3, wherein the act of generating an internal verifier includes applying the mask and the authentication key as inputs to an embedded private-key encryption algorithm to generate the internal verifier.

5. A method according to claim 1, further comprising:
   storing the encrypted authentication key in the wireless communication device during the manufacturing of the wireless communication device.

6. A method according to claim 1, further comprising:
   storing the encrypted authentication key in the wireless communication device prior to the transmission of the unique identifier.

7. A wireless communication device, comprising:
   a memory for storing at least one activation pair consisting of a unique identifier and an encrypted authentication key;
   an input section for generating an initiation signal to initiate the activation of the wireless communication device in response to an input from a user;
   a processor, coupled to the memory and the input section, for selecting an activation pair in response to the initiation signal from the input section and for extracting the unique identifier from the selected activation pair; and
   a transceiver, coupled to the processor, for transmitting the unique identifier extracted by the processor and for receiving a mask in response to the transmission of the unique identifier,
   wherein the processor includes a decryption section for recovering an authentication key for activating the wireless communication device by applying the mask to the encrypted authentication key of the selected activation pair.

8. A wireless communication device according to claim 7, wherein the transceiver includes an antenna for wirelessly transmitting the unique identifier.

9. A wireless communication device according to claim 7, wherein the transceiver includes a reception section for receiving an external verifier in response to the transmission of the unique identifier.

10. A wireless communication device according to claim 9, further comprising:
    an authenticator, coupled to the processor for generating an internal verifier using the mask and the authentication key and for authenticating the mask by comparing the external verifier to the internal verifier.

11. A wireless communication device according to claim 10,
    wherein the authenticator includes a verification generator for generating the internal verifier by applying the mask and the authentication key to an embedded private-key encryption algorithm.

12. A system for activating a wireless communication device, the system comprising:
    a memory having program instructions; and
    a processor configured to use the program instructions to transmit an identifier corresponding to an encrypted authentication key stored in the wireless communication device from the wireless communication device;
    receive a mask at the wireless communication device in response to the transmission of the identifier; and
    recover an authentication key for activating the wireless communication device by applying the mask to the encrypted authentication key.

13. A system according to claim 12, wherein the program instruction to receive a mask includes the sub-instruction to receive an external verifier in response to the transmission of the identifier.

14. A system according to claim 13, wherein the processor is further configured to use the program instructions to generate an internal verifier using the mask and the authentication key and authenticate the mask by comparing the external verifier to the internal verifier.

15. A system according to claim 14, wherein the program instruction to generate an internal verifier includes the sub-instruction to apply the mask and the authentication key as inputs to an embedded private-key encryption algorithm to generate the internal verifier.

16. A method for activating a wireless communication device by a carrier, comprising:

receiving at the carrier an identifier from the wireless communication device corresponding to an encrypted authentication key stored in the wireless communication device; and transmitting a mask corresponding to the identifier from the carrier to the wireless communication device in response to the transmission of the identifier, wherein the mask recovers an authentication key for activating the wireless communication device by applying the mask to the encrypted authentication key.

17. A method according to claim 16, wherein the act of transmitting a mask includes transmitting the received identifier to a clearinghouse and receiving the mask from the clearinghouse in response to the transmission of the identifier.

18. A method according to claim 16, wherein the act of transmitting a mask includes transmitting an external verifier to the wireless communication device.

19. A method according to claim 18, wherein the act of transmitting an external verifier includes transmitting the received identifier to a clearinghouse and receiving the external verifier from the clearinghouse in response to the transmission of the identifier.

20. A carrier for activating a wireless communication device, comprising:

a memory having program instructions; and a processor configured to use the program instructions to receive an identifier corresponding to an encrypted authentication key stored in the wireless communication device from the wireless communication device; and transmit a mask corresponding to the identifier to the wireless communication device in response to the transmission of the identifier, wherein the mask recovers an authentication key for activating the wireless communication device by applying the mask to the encrypted authentication key.

21. A carrier according to claim 20, wherein the program instruction to receive an identifier includes the sub-instructions of transmitting the received identifier to a clearinghouse and receiving the mask from the clearinghouse in response to the transmission of the identifier.

22. A carrier according to claim 20, wherein the program instruction to transmit a mask includes the sub-instruction to transmit an external verifier to the wireless communication device.

23. A carrier according to claim 22, wherein the program instruction to transmit an external verifier includes the sub-instructions to transmit the received identifier to a clearinghouse and receive the external verifier from the clearinghouse in response to the transmission of the identifier.

24. A clearinghouse for activating a wireless communication device, comprising:

a memory having program instructions; and a processor configured to use the program instructions to generate an activation pair consisting of an identifier and an encrypted authentication key; transmit the activation pair to a manufacturer for storage in the wireless communication device; receive the identifier from the wireless communication device; and transmit a mask corresponding to the identifier to the wireless communication device, wherein the mask recovers an authentication key for activating the wireless communication device by applying the mask to the encrypted authentication key.

25. A clearinghouse according to claim 24, wherein the program instruction to receive the identifier includes the sub-instruction to receive the identifier via a secure communication line coupled to a carrier.

* * * * *